(12) United States Patent
Shimizu

(10) Patent No.: US 6,788,996 B2
(45) Date of Patent: Sep. 7, 2004

(54) FABRICATION METHOD OF SEMICONDUCTOR INTEGRATED CIRCUIT DEVICE

(76) Inventor: Michiyuki Shimizu, Hitachinaka (JP)

( * ) Notice: Subject to any disclaimer, the term of this patent is extended or adjusted under 35 U.S.C. 154(b) by 150 days.

(21) Appl. No.: 10/091,478

(22) Filed: Mar. 7, 2002

(65) Prior Publication Data

US 2002/0155705 A1 Oct. 24, 2002

(30) Foreign Application Priority Data

Apr. 19, 2001 (JP) ........................................ 2001-121176

(51) Int. Cl.[7] ............................. G06F 7/00; G06F 19/00
(52) U.S. Cl. ........................ 700/213; 700/223; 700/228; 700/100; 414/935
(58) Field of Search ................................. 700/100, 101, 700/102, 213, 223, 226, 228; 414/800, 935

(56) References Cited

U.S. PATENT DOCUMENTS

| 5,841,677 | A | * | 11/1998 | Yang et al. | 700/100 |
|---|---|---|---|---|---|
| 6,092,000 | A | * | 7/2000 | Kuo et al. | 700/115 |
| 6,201,998 | B1 | * | 3/2001 | Lin et al. | 414/936 |
| 6,560,507 | B1 | * | 5/2003 | Malitsky et al. | 700/213 |
| 6,584,371 | B1 | * | 6/2003 | Sada et al. | 700/225 |
| 6,591,163 | B2 | * | 7/2003 | Nakashima | 700/228 |

* cited by examiner

*Primary Examiner*—Gene O. Crawford

(57) ABSTRACT

To reduce the manufacturing time in a production line for a semiconductor integrated circuit device, plural wafers in a lot are divided into a number of groups according to a selected number of manufacturing devices to be used for further processing of the wafers. Each group of wafers is allocated to a respective one of plural manufacturing devices in a state in which each group is housed in a respective one of plural division carriers and one sheet processing is applied to the wafer groups in the plural manufacturing devices in parallel.

33 Claims, 12 Drawing Sheets

| LOT NO. | LOT CARRIER ID | WAFER ID |
|---|---|---|
| ○○○ | △△△ | □□▷ □□▷ □▷ *** |
| . | . | . . . . |

FIG. 7(a)

| LOT NO. | LOT CARRIER ID | WAFER ID | DIVISION INFORMATION |
|---|---|---|---|
| ○○○ | △△△ | □□▷ □□▷ □▷ *** | ⌐⌐ .. |
| . | . | . . . . | |

FIG. 7(b)

| LOT NO. | LOT CARRIER ID | WAFER ID | DIVISION CARRIER |
|---|---|---|---|
| ○○○ | △△△ | □□▷ □□▷ □▷ *** | ⌐⌐ .. |
| . | . | . . . . | |

FIG. 7(c)

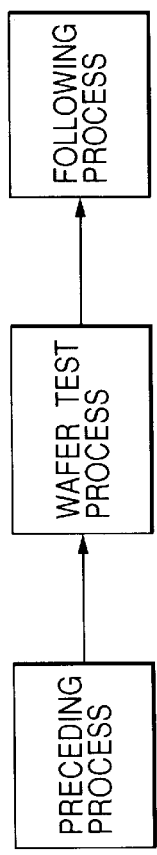
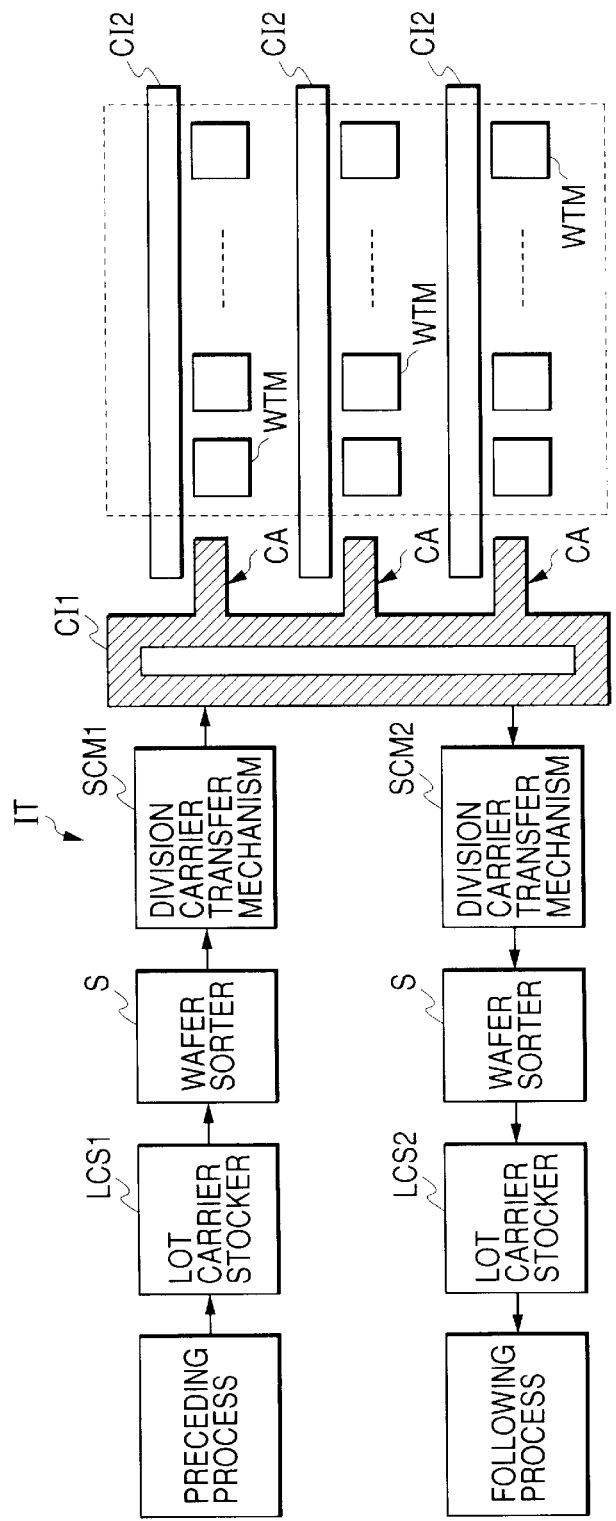

FABRICATION METHOD OF SEMICONDUCTOR INTEGRATED CIRCUIT DEVICE

BACKGROUND OF THE INVENTION

The present invention relates to semiconductor integrated circuit device manufacturing technology; and, more particularly, the invention relates to a technique that is effective when applied to production control in a production line for fabrication of a semiconductor integrated circuit device.

The production of a semiconductor integrated circuit device is generally controlled on the basis of an individual lot. One lot is normally formed by an aggregate of plural wafers, such as approximately 25 wafers. In a production line for a semiconductor integrated circuit device, in units of a lot, that is, in a state in which plural wafers forming one lot are housed in one carrier, conveyance between manufacturing devices is controlled, in addition to the production progress control of a product and processor allocation control. In production control technology examined by the present inventors, one lot (one carrier) is allocated to one manufacturing device as it is, and in the manufacturing device, the wafers in the lot are processed individually in sequence.

A technique related to a production line for a semiconductor integrated circuit device is disclosed in Japanese unexamined patent publication No. 2000-332080, which describes a configuration wherein plural different processors are connected via a one sheet carriage mechanism, whereby semiconductor substrates can be carried to an individual processor one by one.

Also, Japanese unexamined patent publication No. Hei5 (1993)-343497 discloses a wafer carriage technique wherein plural wafers to be inspected, that are housed in a predetermined cassette in the cassette stock, are extracted one by one and carried to plural wafer inspection stations for wafer inspection. Then, the wafers in the wafer inspection stations, for which inspection is completed, are carried to an original cassette and are housed therein.

Also, Japanese unexamined patent publication No. Hei3 (1991)-289152 discloses a series of inspection process steps involving a technique in which, after wafers housed in a cassette are extracted one by one by carriage means, the carriage means is driven along a carriage route under computer control, is automatically guided to each of plural measurement units arranged on both sides of the carriage route and each wafer is inspected therein.

Also, Japanese unexamined patent publication No. Hei5 (1993)-136219 discloses a technique for providing a carriage mechanism for carrying a semiconductor wafer and a carriage mechanism for carrying a probe card for checking the electric characteristics of the semiconductor wafers between a stocker and inspection equipment, so as to enable inspection according to the semiconductor wafer to be inspected. Also, Japanese unexamined patent publication No. Hei11(1999)-45916 discloses a technique in which plural probing stations are provided for testing a semiconductor wafer, and in which testing of semiconductor wafers one by one is effected in each probing station.

SUMMARY OF THE INVENTION

Recently, in the development of a production line for a semiconductor integrated circuit device, a reduction (quick turnaround time (QTAT)) of the manufacturing time of a semiconductor integrated circuit device has become an important aspect.

One QTAT technique for a semiconductor integrated circuit device, that was examined by the present inventors, involves a method of reducing the lot size (the number of wafers housed in a carrier). Thereby, the waiting time for processing of wafers in a lot can be reduced and the manufacturing time per process can be reduced. Also, since wafers are processed one by one in a one sheet processor in the manufacture of a semiconductor integrated circuit device, it can be expected that the manufacturing time can be further reduced by making the lot size equal one sheet. However, when the lot size was made equal to one sheet or was extremely reduced, it was first found by the present inventors that the following problems occurred. That is, multiple carriers were required in a production line, the load on the carriage between manufacturing devices (processes) was increased, and, conversely, the production efficiency tended to be deteriorated.

An object of the present invention is to provide a technique for reducing the manufacturing time in a production line for manufacture of a semiconductor integrated circuit device.

The foregoing and other objects of the present invention and new characteristics thereof will become more apparent from the description in the following specification and from the attached drawings.

Of the various aspects of the invention disclosed in this specification, a brief description of representative features will be summarized as follows.

That is, the invention is characterized by dividing plural wafers into groups of wafers in a control unit, allocating these groups of wafers to plural one sheet processors of the same kind and processing them in these one sheet processors in parallel.

Also, the invention proposes to divide plural wafers into groups of wafers in a control unit for every different manufacturing process according to a rule determined in each manufacturing process and to allocate the divided wafer groups to plural one sheet processors of the same kind in each manufacturing process and processing them in the plural one sheet processors in parallel.

Also, the invention includes a process for carrying plural wafers in a control unit to a manufacturing process, a process for dividing the plural wafers into wafer groups in the control unit according to a group of plural one sheet processors of the same kind used in the manufacturing process, and a process for allocating the divided wafer groups to the plural one sheet processors and processing them in the plural one sheet processors in parallel.

Also, in accordance with the invention, the divided wafer groups are allocated to the plural one sheet processors in a state in which each divided wafer group is housed in a respective carriage container.

Also, in accordance with the invention, the management of a vacant carriage container used after division and operation control are performed.

Also, in accordance with the invention, a vacant carriage container for housing a divided one or plural wafer groups is managed.

Also, in accordance with the invention, a vacant carriage container for housing a divided one or plural wafer groups is managed and the vacant carriage container is automatically carried to equipment for division.

BRIEF DESCRIPTION OF THE DRAWINGS

FIGS. 7(a) to 7(c) are various information tables used in the manufacturing system shown in FIG. 5;

FIG. 8(a) is a flowchart showing a manufacturing process equivalent to one embodiment of the invention in the fabrication of a semiconductor integrated circuit device, and FIG. 8(b) is a diagram showing the configuration of the manufacturing process shown in FIG. 8(a);

DETAILED DESCRIPTION OF THE PREFERRED EMBODIMENTS

Figure 1:
FIG. 1 is a table showing the throughput, the number of manufacturing devices and TAT of every process in a production line for a semiconductor integrated circuit device.

Before the invention is described in detail, the meaning of terminology used to describe the invention will be explained as follows.

1. A semiconductor integrated circuit device includes not only one formed on a monocrystalline silicon substrate, but also one formed on another substrate, such as a silicon on insulator (SOI) substrate and a substrate for manufacturing a thin film transistor (TFT) for a liquid crystal display, except for a case in which it is specified that a semiconductor integrated circuit device formed on another substrate is not included.

2. A wafer includes a monocrystalline silicon substrate (also called a semiconductor wafer or a semiconductor substrate and generally substantially disclike), a silicon on sapphire (SOS) substrate, a glass substrate, another insulating, semi-insulating or semiconductor substrate and a substrate acquired by combining them, respectively, as used for manufacturing a semiconductor integrated circuit device.

3. A semiconductor integrated circuit chip or a semiconductor chip (hereinafter merely called a chip) is an element acquired by dividing a wafer, a process for which is completed, into unit circuit groups.

4. A one sheet process is a method of processing one or two wafers at a time in case various processings are applied to a wafer. Since a processing condition can be controlled for every wafer, the one sheet process is excellent in the precision of processing and repeatability, and further, it is advantageous to the miniaturization of the processor itself.

5. A control unit is a unit formed by the aggregate of plural wafers processed on an equal condition or plural wafers put together for a predetermined purpose for the production control of a semiconductor integrated circuit device. Generally, a lot is equivalent to a control unit. The control unit is equivalent to a process completion control unit, a production proceeding unit, a production unit, a processing unit, an order unit or a carriage unit or includes these.

6. Lot size represents the number of wafers housed in a carriage means (a carrier) for carrying wafers as a size. A case whose lot size is 12 sheets means that one lot includes 12 wafers.

7. The division of a lot means subdividing a lot (or a lot carrier) into sublots when lot production proceeds to one sheet production. The production of a semiconductor integrated circuit device after the division of a lot (before organizing a lot again) is controlled in units of carriage means (a division carrier) for carrying a divided one or plural wafers or in units of a wafer.

8. A lot carrier is a carrier for housing the aggregate of wafers forming a lot.

9. A division carrier is a carrier for housing one or plural wafers acquired by dividing a lot. Though the invention is not particularly limited in this regard, a group of one or plural wafers in a division carrier is called a divisional body (also called a divided lot or group). A division carrier in which one or plural wafers are housed can be also called a divisional body.

10. Continuous carriage is a continuous automatic carriage without passing a carrier holder, such as a stocker, in a process for carrying a carrier to a manufacturing device through a carriage route.

11. A preceding process is also called a wafer process and generally is a process for forming components on the main surface of a wafer to which mirror polishing is applied, forming a wiring layer and performing each electric test of plural chips formed on the wafer using a probe and other devices after a surface protecting film is formed.

12. A succeeding process is a process after the preceding process and includes a process for dividing a wafer, the preceding process of which is completed, for every chip and extracting wiring as a lead wire from a minute electrode of a non-defective chip and a process for finishing a final product via a sealing process for protecting these from the ambient environment.

13. Carriage between processes means carriage for connecting processes, each of which includes a respective group of manufacturing processes in the manufacture of a semiconductor integrated circuit device. Generally, in a process, a stocker (storage facility) for the process exists. Carriage between processes often means carriage between stockers.

14. In-process carriage means a carriage in one process, including each group of manufacturing processes in the manufacture of a semiconductor integrated circuit device. Generally, in a process, a stocker (storage facility) for the process exists. Carriage in a process means carriage between the stocker and manufacturing device or carriage between manufacturing devices.

In the following description of the embodiments, the invention is described in plural sections or embodiments for convenience if necessary, however, except for a specified case, it is to be understood that they are related, one is a part of the other or is a transformed example, the details and the supporting explanation of the whole.

In the following description of the embodiments, in case a number (including the numeric value, the quantity and the range) of components is referred to, it is to be understood that the invention is not limited to that specific number, except for a specified case and a case where a specific number is definitely referred to, and the number of components may be also more or less than the specific number.

Further, in the following embodiments, except for a case in which a component (including a step) is specified or is definitely considered essential, it need scarcely be said that the component is not necessarily essential.

Similarly, in the following description of the embodiments, when the shape and the positional relation of a component are referred to, a shape substantially close to or similar to the shape and others are included, except for a case where they are specified or are considered definitely wrong in theory. This is also similar for a numeric value and a range.

In all of the drawings, the same reference number or reference character is allocated to a component having the same function, and a repeated description thereof is omitted.

In this embodiment, a metal insulator semiconductor field effect transistor (MIS FET) that represents a field effect transistor is abbreviated as MIS, a P-channel MIS FET is abbreviated as pMIS and an N-channel MIS FET is abbreviated as nMIS.

Various embodiments of the present invention will be described in detail with reference to the drawings.

First Embodiment

FIG. 1 shows an example of the throughput in processes A to F in a production line for manufacture of a semiconductor integrated circuit device and the TAT per process for every number of manufacturing devices and every lot size. A production line for a semiconductor integrated circuit device is normally designed so that the throughput (the number of processed wafers per hour) of each process A to F is uniform. However, for the processing time of each process A to F, for example, in the process A, it takes 30 minutes to process a wafer, while in the process E, it takes two hours to process a wafer, and so the processing time is generally not uniform. Therefore, to unify the throughput, the number of manufacturing devices being used is required to be varied according to each process A to F. For example, the manufacturing device in the process E is designed so that it has a throughput equivalent to four times the throughput of the process A.

The TAT of the overall manufacture of a product depends upon the TAT of each process A to F, and to reduce the TAT of the whole product, it is effective to reduce the TAT of a process which has a long processing time. For this purpose, there is a method which involves reducing the lot size. For example, in case the lot size is 25, the TAT of the whole product is 125×k1 (hours), while in case the lot size is 12 or 2, the TAT of the whole product can be 60×k2 (hours) or 10×k3 (hours) (k1 to k3 are a variable, such as a waiting time). However, the present inventors for the first time found a new problem in that, when the lot size was one or extremely small in an actual production line for the manufacture of a semiconductor integrated circuit device, the number of carriers in the production line was increased, the load on the carriage of the carriers (that is, the carriage of carriers in the whole production line) between manufacturing devices (processes) was increased, and, conversely, the whole production efficiency of the semiconductor integrated circuit device might be deteriorated.

In this embodiment, a method of enabling the QTAT of the whole semiconductor integrated circuit device, without causing a problem in the production line for the semiconductor integrated circuit device, will be described below.

Figure 2:
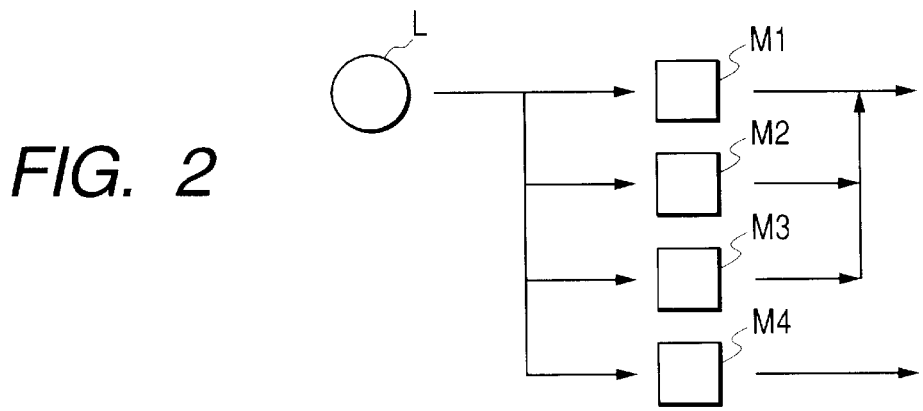
FIG. 2 is a diagram illustrating the basic configuration according to one embodiment of the invention of one manufacturing process in a method of fabrication of a semiconductor integrated circuit device.

FIG. 2 shows the basic configuration according to this embodiment of the manufacturing process used in the fabrication of a semiconductor integrated circuit device. The reference character L denotes a lot and M1 to M4 denote manufacturing devices. In this case, lot size is 12 and the number of manufacturing devices M1 to M4 is 4. The manufacturing devices M1 to M4 basically have the same throughput and comprise a one sheet processor that can execute the same processing.

In this embodiment, first, one lot L is divided. More specifically, one lot L is divided into plural carriers (division carriers, divisional bodies). The divided number is normally equal to the number of manufacturing devices available for use in the manufacturing process. For example, in case all of the manufacturing devices M1 to M4 are available for use, one lot is divided into four carriers. Basically, wafers are uniformly divided into each carrier. In this case, when the lot size is 12, three wafers are housed in each carrier. However, in case more efficient processing is possible when wafers are not uniformly divided, a different number of wafers also can be divided into each carrier.

As described above, each carrier is allocated to a respective one of the manufacturing devices M1 to M4 and processing is applied to wafers in each carrier one by one. At this time, each division carrier is allocated to a respective manufacturing device so that plural division carriers are simultaneously driven and wafers in the plural division carriers are processed in parallel. The simultaneous driving described above means that each division carrier is not placed in a queue of each manufacturing device. Or, simultaneous driving means that, even if the time of commencement is different among each division carrier, processing is finally finished without there being a large difference in time from the time of the division carrier whose processing is finished earliest. If the division carrier is merely placed in a queue of the corresponding manufacturing device, the effect of reducing the TAT is reduced. For example, if plural division carriers are all placed in a queue of one manufacturing device, the case is similar to a case where no division is made. Thus, since the waiting time for processing of wafers in a lot can be reduced in each manufacturing device by simultaneously driving plural division carriers and processing wafers in the plural division carriers in parallel, the TAT per lot in the corresponding process can be reduced. Therefore, it is desirable that this method is particularly applied to a process in which the processing time is relatively long and a process in which the reduction of the processing time is demanded in the manufacture of the semiconductor integrated circuit device. Hereby, the overall QTAT of the semiconductor integrated circuit device can be realized.

After the processing is finished, wafers in each division carrier that are to be a lot are collected (in other words, each division carrier is collected) and are carried to the next manufacturing process. The increase of the number of carriers, which is the problem described above, can be prevented by collecting the division carriers after processing as described above, whereby deterioration of the production efficiency can be avoided. In this case, the carriers also may be collected to be an original lot, however, they also may be not necessarily so collected. That is, the carriers may be also put in another lot. In FIG. 2, in case processing in the manufacturing device M4 is delayed for any reason (situation), a case is adopted in which the carriers, in which wafers processed by the manufacturing devices M1 to M3 are respectively housed, are collected as shown.

Figure 3:
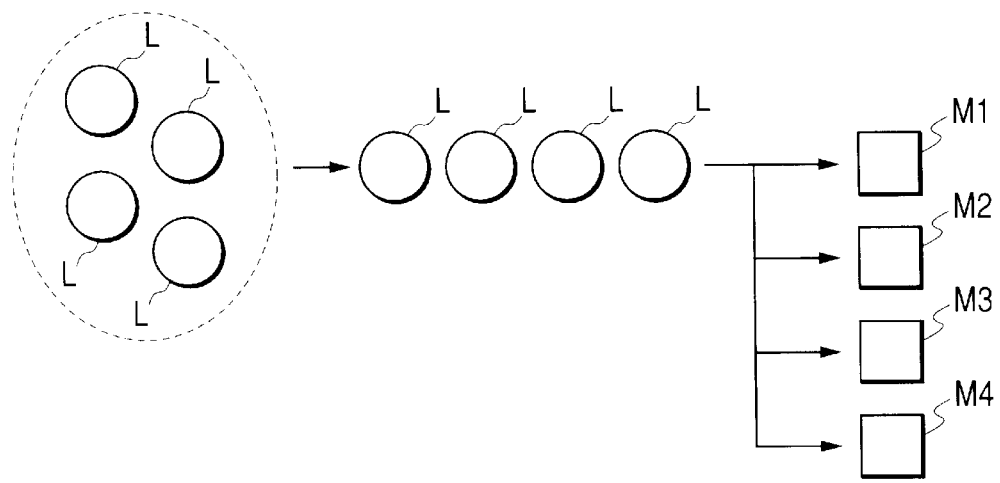
FIG. 3 is a diagram illustrating the effect of the fabrication method according to one embodiment of the invention in the fabrication of a semiconductor integrated circuit device.
Figure 4:
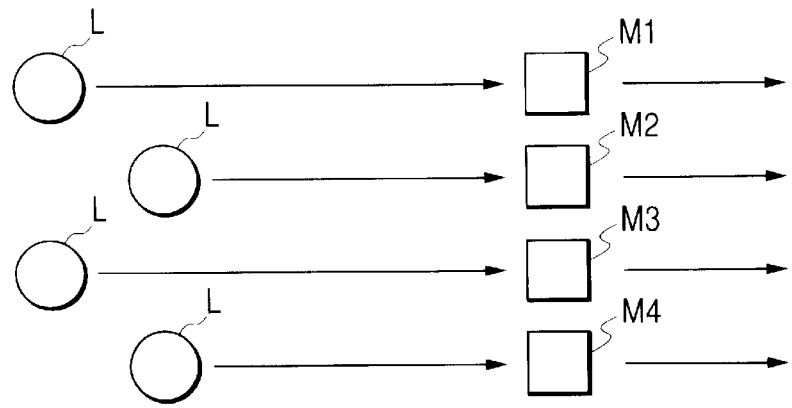
FIG. 4 is a diagram illustrating a fabrication method of allocating one manufacturing device to one lot as considered by the present inventors.

Such a method of dividing a lot is also effective in case plural lots exist in the manufacturing process. FIG. 3 shows this state and shows a case in which four lots L, for example, reach the manufacturing process in an irregular group. FIG. 4 shows a method considered by the present inventors and shows a method of allocating one lot to one manufacturing device for comparison. In FIG. 3, each lot L is divided into four groups, including three wafers in each group, and the divided wafers are respectively allocated to the manufacturing devices M1 to M4. In this case, if the throughput of each of the manufacturing devices M1 to M4 is 0.5 hour (30 minutes), it takes 1.5 hours to process a first lot. It takes a total of (1.5+1.5)=3.0 hours to process a second lot in addition to the first lot, it takes total 4.5 hours to process a third lot in addition to the first and second lots, and it takes total 6 hours to process a fourth lot in addition to the first to third lots. In this case, the processing time of one lot in the manufacturing process is equivalent to 1.5 hours. In the meantime, in the case shown in FIG. 4, since one lot (including twelve wafers) is processed by one manufacturing device, the processing time of one lot in the manufacturing process is equivalent to 6 hours. In the case shown in FIG. 3, in case the processing is delayed in one manufacturing device, the delay of processing can be reduced by allocating a division carrier of the next lot to the other manufacturing device, whereby the delay of the processing time in the manufacturing process can be reduced. Thereby, the flow of the whole manufacturing process of the semiconductor integrated circuit device can be smoothed. In the meantime, in the case shown in FIG. 4, since one lot corresponds to one manufacturing device, the time of the latest lot has an effect upon the processing time of the manufacturing process if processing is delayed in one manufacturing device.

Figure 5:
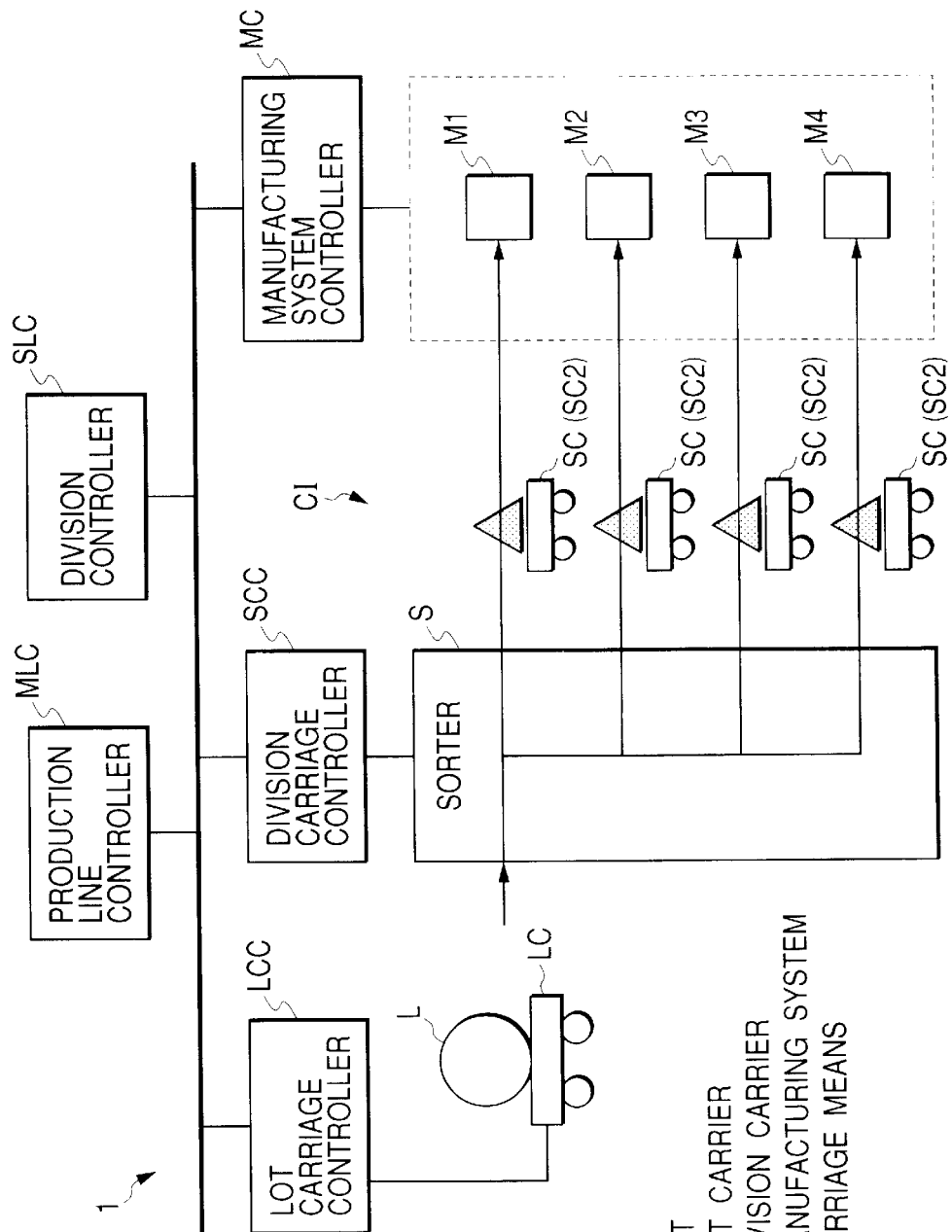
FIG. 5 is a diagram showing an example of the basic configuration of a manufacturing system according to one embodiment of the invention in the fabrication of a semiconductor integrated circuit device.
Figure 6:
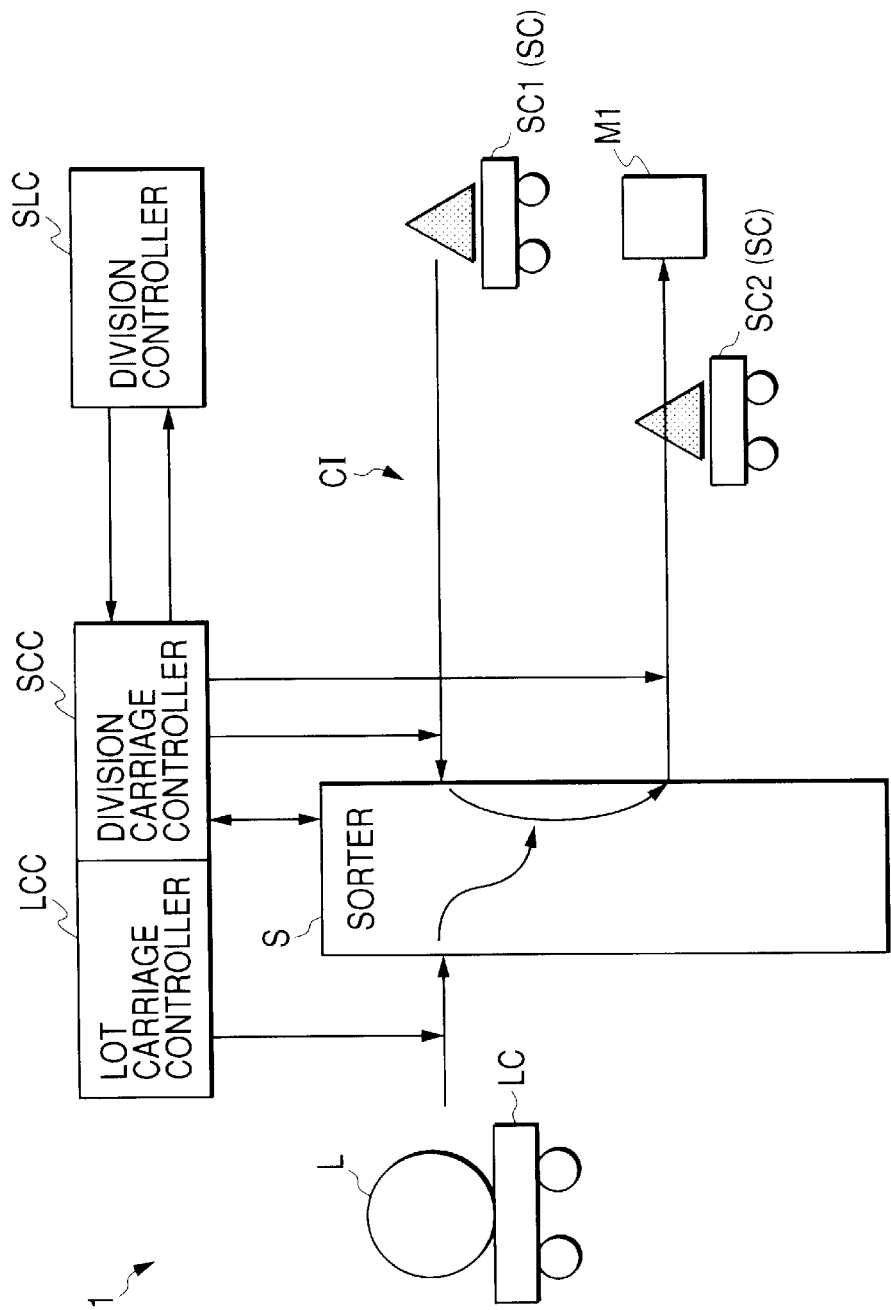
FIG. 6 is a diagram showing the in-process carriage in the manufacturing system shown in FIG. 5.

Next, FIG. 5 shows an example of the basic configuration of the manufacturing system according to this embodiment of the present invention for fabrication of a semiconductor integrated circuit device. FIG. 6 is a diagram showing a carriage in a process in the manufacturing system shown in FIG. 5. Further, FIGS. 7(a) to 7(c) show various information tables used in the manufacturing system shown in FIG. 5. In FIGS. 5 and 6, to make the drawings more clearly understandable, a following vacant division carrier and a division carrier are differentiated by not hatching the vacant division carrier SC (SC1) in which no wafer is housed and hatching the division carrier SC (SC2) in which wafers are housed.

This manufacturing system 1 is provided with a production line controller MLC, a division controller SLC, a lot carriage controller LCC, a division carriage controller SCC, a manufacturing device controller MC, a lot carrier LC, a sorter S, in-process carriage means CI, a division carrier SC and manufacturing devices M1 to M4, as shown in FIG. 5.

The production line controller MLC controls the operation of the whole manufacturing system 1. The production line controller MLC manages the lot information table shown in FIG. 7(a). In the lot information table, the information of a lot, such as a lot number, lot carrier ID (an identification number) and wafer ID, is written.

The division controller SLC controls the operation of carriers after a lot is divided. The division controller SLC manages the division information table shown in FIG. 7(b) and the division management table shown in FIG. 7(c). In the division information table, a lot number, lot carrier ID, wafer ID and the division information of wafers corresponding to them are written. In the division management table, a lot number, lot carrier ID, wafer ID and the information of division carriers corresponding to them are written.

The lot carriage controller LCC controls the carriage operation of the lot carrier LC. The lot carrier LC is a carriage container for housing plural wafers forming a lot. The division carriage controller SCC controls the carriage operation of a vacant division carrier SC and the division carrier SC that houses wafers. That is, in this embodiment, the division controller SLC and the division carriage controller SCC are installed and the division carrier SC (the divided lot, the divisional body) can carry wafers in a process. The division carrier SC is a carriage container for housing a group (a divisional body) of one or plural wafers acquired by dividing a lot. The number of wafers housed in the division carrier SC is smaller than the number of wafers in a lot in this embodiment. This embodiment is provided with a function for automatically managing the information, such as the location and ID of a vacant division carrier SC, and automatically carrying the vacant division carrier to the sorter S. Thereby, the carriage operation of a vacant division carrier in a carriage route becomes satisfactory, and a housing process when wafers are housed can be smoothly executed. The sorter S is provided with a function for dividing a lot as described above and respectively housing one or plural wafers (a divisional body) acquired by division in different vacant division carriers. The manufacturing device controller MC controls the processing operation of each of the manufacturing devices M1 to M4.

Next, the operation of the manufacturing system 1 will be described. First, when a lot L reaches the manufacturing process, the division controller SLC selects N usable manufacturing devices out of a group of the manufacturing devices M1 to M4. Next, the division carriage controller SCC operates the sorter S and divides a lot based upon the division information table transmitted from the division controller SLC. At this time, the sorter S matches wafer ID with division carrier ID, transmits the information to the division controller SLC via the division carriage controller SCC and stores it in the division management table.

The division carriage controller SCC prepares vacant division carriers SC1 (see FIG. 6) equivalent to the divided number of a lot and carries them to the sorter S via the in-process carriage means CI. The sorter S transfers wafers acquired by dividing a lot L into the vacant division carriers SC1 by predetermined numbers. Afterward, the division carriage controller SCC causes the plural division carriers SC2 in which wafers are housed to be carried to each of the manufacturing devices M1 to M4 via the in-process carriage means CI. Afterward, as described above, each of the manufacturing devices M1 to M4 processes the wafers in parallel.

The division controller SLC instructs the division of a lot according to the information of a group of manufacturing devices. Basically, a lot is divided so that the number of wafers in each division carrier SC is equal. If the manufacturing devices M1 to M4 are usable, one lot including 12 wafers is divided into groups of 3 wafers each. However, a lot also can be divided according to the operational situation and the state of a process of each manufacturing device in a group of manufacturing devices. In case two wafers, no wafer, one wafer and one wafer are respectively being processed by the manufacturing devices M1 to M4, one lot including 12 wafers is divided into two wafers, four wafers, three wafers and three wafers. Thereby, the load of each of the manufacturing devices M1 to M4 in this manufacturing process can be equalized. In case the manufacturing device M4 is stopped as planned, one lot including 12 wafers is divided into three groups (four wafers in each) and the wafers then can be processed by the three manufacturing devices M1 to M3. Hereby, flexible correspondence is enabled according to the state and availability of the manufacturing devices.

Next, referring to FIGS. 8 to 12, an example of a specific manufacturing process in a method of manufacture of a semiconductor integrated circuit device according to this embodiment, will be described.

A case in which the technical idea of the invention is applied to a wafer test process will be described below. The wafer test process is a process in which a probe is placed in contact with an external terminal of a chip on a wafer, and the electric characteristics of the chip are tested after the preceding process and before a succeeding process, as shown in FIG. 8(*a*). This embodiment is applied to this process for the following reason. That is, the reason for this is that more time may be required to test one wafer, because the number of chips formed on one wafer is increased as the diameter of a wafer is extended.

FIG. 8(*b*) shows an example of the configuration of a wafer test process IT according to this embodiment. The wafer test process IT requires lot carrier stockers LCS1 and LCS2, a sorter S, division carrier transfer equipment SCM1 and SCM2, in-process carriage means CI1 and CI2 and a group of plural wafer testers WTM. The wafer test process IT is executed in a clean room, the cleanliness of which is medium (for example, a class 100).

The lot carrier stocker LCS1 is an automated stock room for temporarily storing a lot carrier housing plural wafers, the preceding process of which is finished. The lot carrier stocker LCS2 is an automated stock room for temporarily storing a lot carrier housing plural wafers, the testing of which is finished. Twelve wafers, for example, are housed in one lot carrier.

Figure 9A:
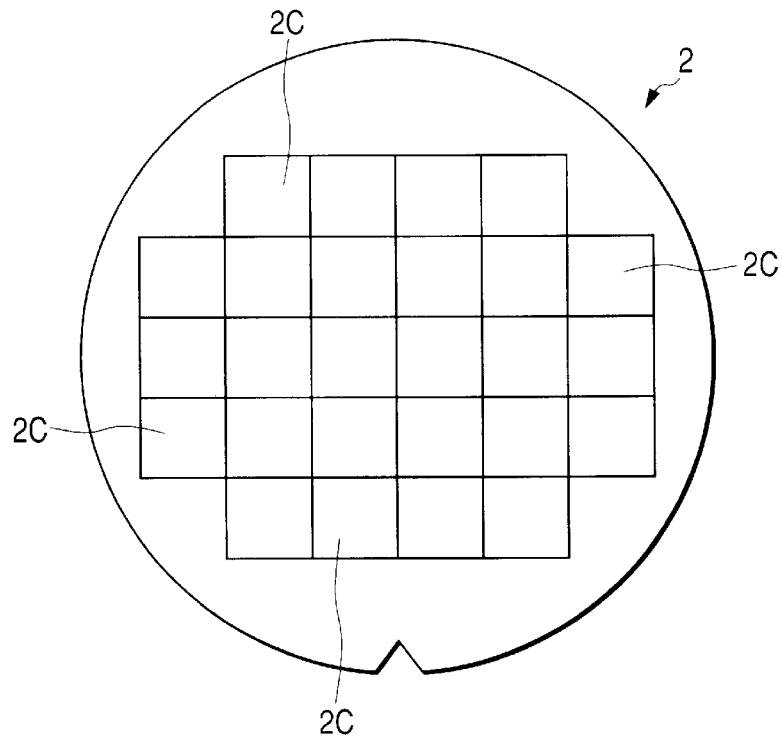
FIG. 9(a) is a plan view of a wafer in the manufacturing process shown in FIGS. 8(a) and 8(b) of the semiconductor integrated circuit device.
Figure 9B:
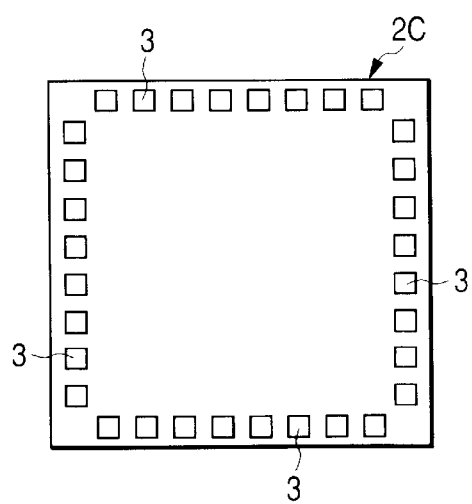
FIG. 9B is an enlarged plan view of a semiconductor chip shown in FIG. 9(a)
Figure 9C:
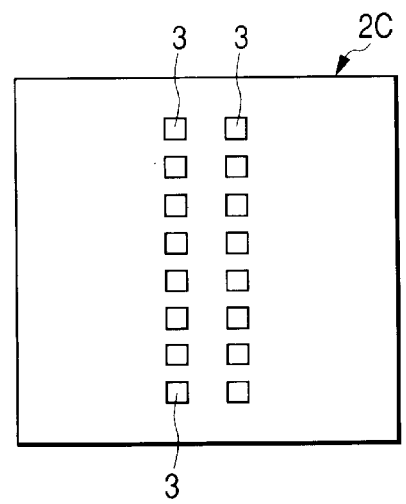
FIG. 9(c) is an enlarged plan view of a semiconductor chip equivalent to a transformed example of the semiconductor chip shown in FIG. 9(b)

FIG. 9(*a*) is a plan view showing the whole wafer 2 at this stage, FIG. 9(*b*) is an enlarged plan view showing a chip 2C formed on the wafer 2 shown in FIG. 9(*a*), and FIG. 9(*c*) is an enlarged plan view showing a chip 2C, which is a transformed example of the chip shown in FIG. 9(*b*). The wafer 2 is a flat and substantially disklike monocrystalline silicon substrate approximately 300 mm in diameter, for example, and on the main surface (a device formation surface), plural flat and square chips 2C, for example, are formed. In each chip 2C at this stage, a predetermined semiconductor integrated circuit, such as an 8-M static random access memory (SRAM), is already formed, and, as shown in FIGS. 9(*b*) and 9(*c*), plural external terminals 3 are regularly arranged thereon. The external terminal 3 is made of metal, such as aluminum, and is a terminal for extracting an electrode of the semiconductor integrated circuit formed in the chip 2C. FIGS. 9(*b*) and 9(*c*) respectively show different layouts of the external terminals 3. In FIG. 9(*b*), the external terminals 3 are arranged along the periphery of the chip 2C, and in FIG. 9(*c*), the external terminals 3 are arranged in the center of the chip 2C. Bonding wire may be connected to each external terminal 3 and a bump electrode may be formed thereon.

Figure 10A:
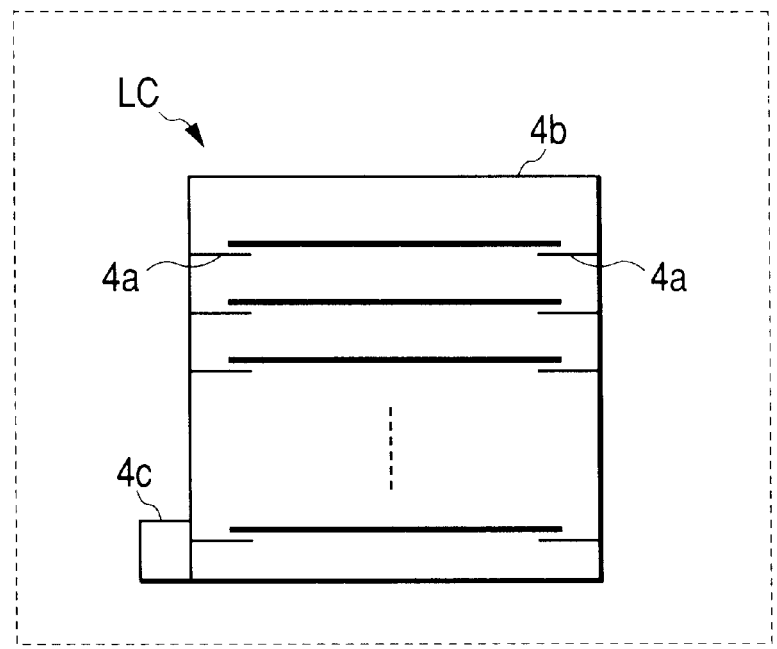
FIG. 10(a) is a diagram showing a lot carrier used in the manufacturing process shown in FIG. 8(b)
Figure 10B:
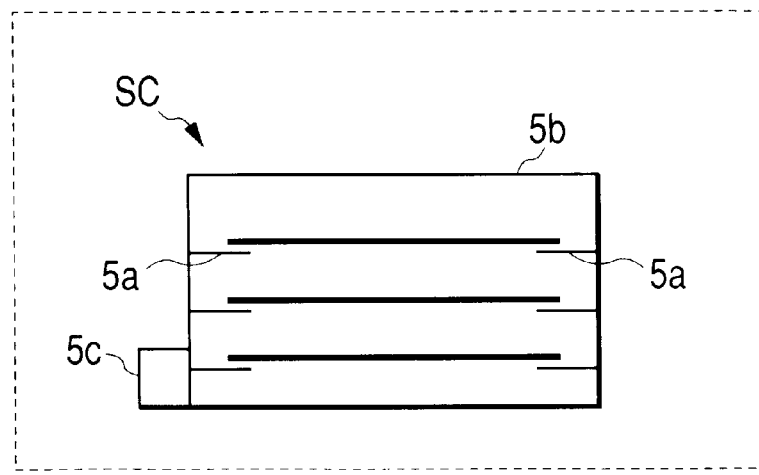
FIG. 10(b) is a diagram showing a division carrier.

In this embodiment, the lot carrier used for carriage between processes and the division carrier used for in-process carriage are different. FIG. 10(*a*) shows the lot carrier (a first carriage container) LC and FIG. 10(*b*) shows the division carrier (a second carriage container) SC. For the lot carrier LC, for example, a carriage container called a front opening unified pod (FOUP) is used. A FOUP is a wafer carriage container that can shield a wafer housing from the outside atmosphere and seal it, and it is provided with a support structure 4*a* for supporting the wafer 2, a cabinet 4*b* that supports the support structure and forms a wafer housing, and an identification (ID) part 4*c* for identifying the information of the lot carrier LC. The lot carrier LC can be controlled by reading information in the ID part 4*c* using a non-contact sensor, such as an optical sensor.

For the division carrier SC, for example, a carriage container called an open cassette is used. The open cassette is a wafer carriage container, the wafer housing of which is not completely shielded from the outside atmosphere and is open and is provided with a support structure 5*a* that supports the wafer 2, a cabinet 5*b* that supports the support structure and forms a wafer housing, and an identification (ID) part 5*c* for identifying the information of the division carrier SC. The control of the division carrier SC (both the vacant division carrier SC and the division carrier SC in which the wafer 2 is housed) by the division controller and the division carriage controller is enabled by reading information in the ID part 5*c* using a non-contact sensor, such as an optical sensor.

Since the number of wafers housed in the division carrier SC is smaller, compared with the number of wafers in the lot carrier LC, the dimension of the height (the direction in which plural wafers 2 are stacked) is set so that it is shorter, compared with the dimension of the height of the lot carrier LC, as shown in FIGS. 10(*a*) and 10(*b*). The division carrier SC can correspond to the carriage operation of the in-process carriage means CI1 and CI2. Space efficiency can be enhanced by using such a small-sized division carrier SC for the in-process carriage means. Thereby, the problem of an increase of the number of division carriers SC also can be solved. However, a FOUP also can be used for the division carrier SC. In place of the cassette type, carriage means provided with a carriage arm that can hold one or plural wafers also can be used.

The division carrier transfer equipment SCM1 shown in FIG. 8(b) is equipment for automatically transferring a vacant division carrier SC to the sorter S and automatically transferring the division carrier SC, in which the wafer 2 is housed, from the sorter S to the in-process carriage means CI1. The division carrier transfer equipment SCM2 is equipment for automatically transferring the division carrier SC, in which the wafer 2 that has already been tested is housed, from the in-process carriage means CI1 to the sorter S and automatically transferring a vacant division carrier to the in-process carriage means CI1.

The in-process carriage means (continuous type first carriage means) CI1 is formed by a floor level clean conveyor, for example, and forms a looped carriage route. The division carrier SC can be cyclically moved in a loop along the in-process carriage means CI1. The in-process carriage means (linear second carriage means) CI2 is provided at the back of the in-process carriage means CI1 so that plural routes are mutually parallel vertically, as seen in FIG. 8(b). The in-process carriage means CI2 is formed by movable transfer equipment, for example, and forms a carriage route that linearly extends in a lateral direction, as seen in FIG. 8(b). The division carrier SC received on the in-process carriage means CI2 is linearly moved and is carried to the wafer tester WTM.

The in-process carnage means CI1 and CI2 are installed so that a part thereof is crossed and the division carrier SC is automatically and continuously received or passed between the in-process carriage means CI1 and CI2 via an overlapped part CA without manual labor and a stocker. Thereby, the division carrier SC can be smoothly carried in a process in a short time. Since no stocker is required in the in-process carriage, the area required for the wafer test process IT can be reduced and the cost can be reduced.

Since the in-process carriage means CI1 is arranged so that it crosses any route of the in-process carriage means CI2, the division carrier SC carried on the in-process carriage means CI1 can be freely and automatically carried to any route of the in-process carriage means CI2.

Figure 11A:
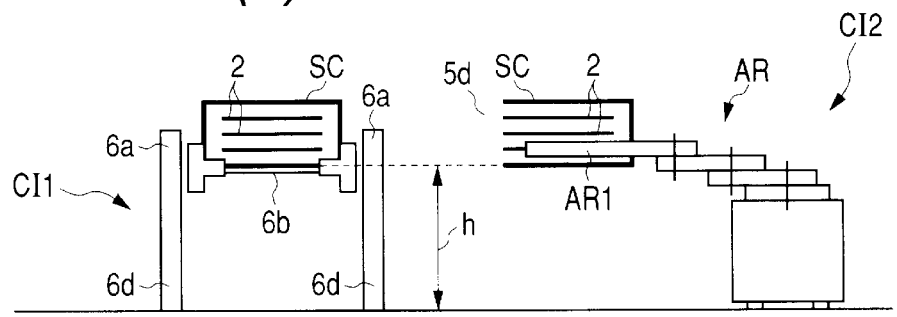
FIG. 11(a) is a diagram showing in-process carriage means in the manufacturing process shown in FIG. 8(b)
Figure 11B:
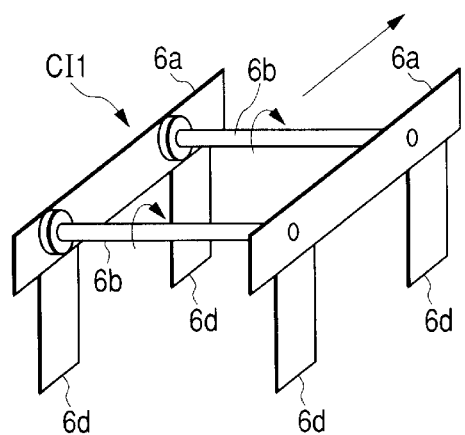
FIG. 11B is a perspective view showing the main part of the in-process carriage means on the right side in FIG. 11(a)
Figure 11C:
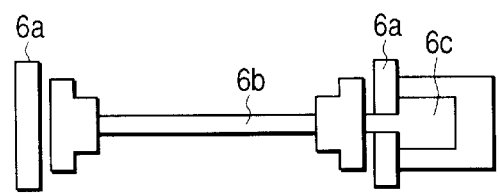
FIG. 11(c) is a plan view of the in-process carriage means shown in FIG. 11(b)
Figure 11D:
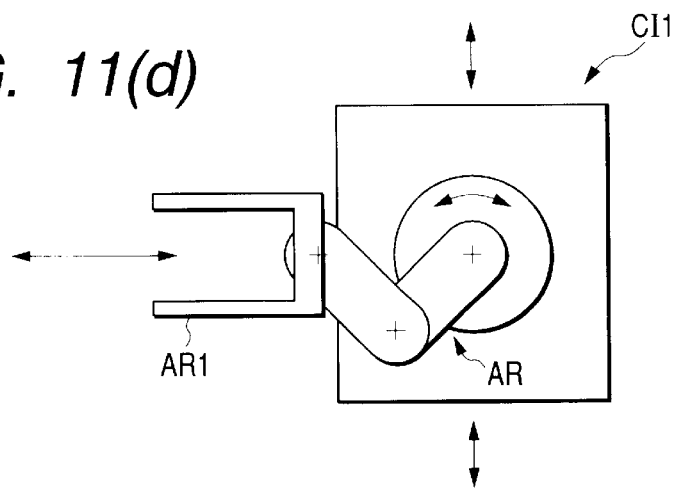
FIG. 11(d) is a top view showing the in-process carriage means on the left side in FIG. 11(a)

FIGS. 11(a) to 11(d) show an example of the in-process carriage means CI1 and CI2. FIG. 11(a) is a side view showing the in-process carriage means CI1 and CI2, FIG. 11(b) is a perspective view showing a part of the in-process carriage means CI1, FIG. 11(c) is a diagram showing the configuration of the part shown in FIG. 11(b), and FIG. 11(d) is a top view showing the in-process carriage means CI2.

The in-process carriage means CI1 is provided with two route formation parts 6a, 6a that mutually extend in parallel, a rotary shaft 6b that extends in a direction perpendicular to these, a motor 6c mechanically connected to one end of the rotary shaft 6b and support structure 6d that supports the structure above the floor. The route formation parts 6a, 6a form the carriage route of the division carrier SC. The rotary shaft 6b is arranged at a predetermined interval in a direction in which the route formation part 6a is extended and is supported in a rotatable state in a direction in which the division carrier SC travels in a state in which the rotary shaft pierces a pulley on the left side and is supported by the left route formation part 6a. The rotational operation of the rotary shaft 6b is controlled by the motor 6c mechanically connected to one end of the rotary shaft. The division carrier SC is carried by the rotational operation of the rotary shaft 6b. Such in-process carriage means CI1 is also provided with a buffer function for processing speed control in a process and timing control in addition to a function for carrying the division carrier SC. Thereby, since the carriage parts in a process and the operation of the wafer tester can be satisfactorily matched in time, the accumulation of the division carriers SC in a process can be inhibited or prevented and an efficient wafer test is enabled.

In the meantime, for the in-process carriage means CI2, for example, a rail guided vehicle (RGV) is used. The in-process carriage means CI2 has a structure in which the division carrier can be driven along a rail provided on the floor. Since the rail serves as a guide, the in-process carriage means CI2 is excellent in stability, high-speed trafficability and precision in stopping. The in-process carriage means CI2 is provided with an arm AR. The division carrier SC can be gripped by a gripping part AR1 provided to the end of the arm AR. The arm AR can be rotated by 360° in a horizontal direction relative to the floor. The gripping part AR1 can be moved along a straight line. The gripping part AR1 grips the division carrier SC so that the side of an opening 5d from which a wafer is extracted is directed toward the outside.

For the in-process carriage means CI2, in place of RGV, for example, an automatic guided vehicle (AGV), overhead hoisting transfer (OHT) or underfloor carriage also may be used. AGV is an automated guided vehicle driven by a battery. It can follow a magnetic or optical guide tape stuck on a floor, a camera, a laser beam and an ultrasonic wave, for example, without using a rail. In case an AGV is adopted, it can flexibly adapt to a change of the layout, a change of the flow of the physical distribution or the construction of a long complex carriage route.

OHT requires a rail and is an automated guided vehicle that travels in space at a ceiling level. The rail is often hung from a ceiling. Since the OHT is excellent from the point of view of the space factor and flexibility, the cost can be reduced. Since the OHT is guided by a rail like the RGV, it is excellent in stability, high-speed trafficability and the precision in stopping.

In this embodiment, the height of the in-process carriage means CI1 and CI2 from the floor is equal. This embodiment is designed so that, particularly, the height from the floor to the bottom of the division carrier SC in the in-process carriage means CI1 and the height from the floor to the bottom of the division carrier SC gripped by the gripping part AR1 in the in-process carriage means CI2, that is, the height (height for receiving or passing) h shown in FIG. 11(a), are substantially equal. In case the in-process carriage means CI2 is formed by OHT, an elevator is provided between the in-process carriage means CI1 and OHT, the division carrier SC is required to be lifted from the height of the in-process carriage means CI1 to the height of OHT and a time delay is caused. In the meantime, in this embodiment, the division carrier SC can be smoothly received or passed for a short time between the in-process carriage means CI1 and CI2 by equalizing the height h of the in-process carriage means CI1 and CI2 without providing an elevator between the in-process carriage means CI1 and CI2. The height h is approximately 900 mm.

Figure 12:
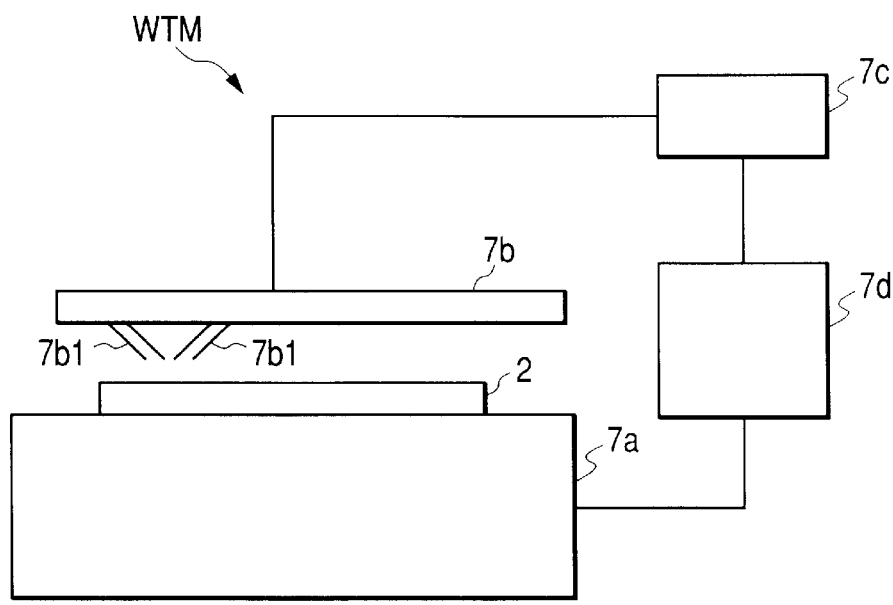
FIG. 12 is a diagram showing the inspection equipment in the manufacturing process shown in FIG. 8(b)

In this embodiment, as shown in FIG. 8(b), plural wafer testers WTM are arranged in the vicinity in the direction of the carriage route of each in-process carriage means CI2. The in-process carriage means CI2 is provided with a function for automatically transferring the division carrier SC to each wafer tester WTM. FIG. 12 shows an example of the wafer tester WTM. The wafer tester WTM is provided with a test head 7a, a probe card 7b, measurement equipment 7c and a controller 7d. The wafer 2 is laid (set) on the test head 7a. The electric characteristics of each chip 2C of the wafer 2 can be measured by the measurement equipment 7c by touching a probe 7b1 of the probe card 7b to the external terminal 3 shown in FIG. 9(b) of each chip 2C of the wafer 2. The controller 7d controls the whole wafer tester WTM. In this case, the wafers 2 are tested one by one.

Next, the processing operation in the wafer test process IT will be described. The lot carrier housing plural wafers, the preceding process of which is finished, is housed in the lot carrier stocker LCS1. The lot carrier housed in the lot carrier stocker LCS1 is carried to the sorter S. In the sorter S, as described above, a lot is divided and wafers are transferred into a vacant division carrier SC. That is, one lot is divided into plural division carriers SC. In this case, one lot including 12 wafers is divided into four groups, each of which includes three wafers. Since the other rules of division are described above, the description thereof is omitted. Next, the plural division carriers SC are automatically transferred to the in-process carriage means CI1. Afterward, the division carriers SC are transferred to the in-process carriage means CI2 via the in-process carriage means CI1 and, further, are carried to predetermined wafer testers WTM allocated to the respective division carriers SC. Since this method of allocation is also the same as the above-mentioned method, the description thereof is omitted. In the wafer tester WTM, wafers 2 in the division carrier SC are extracted one by one and the electric characteristics of each chip 2C of the wafer 2 are tested. In each wafer tester WTM, only three wafers 2 have to be tested one by one. The time required to test wafers in one division carrier SC is approximately 6 hours. After the test of all wafers 2 in the division carrier SC is finished, as described above, the wafer 2 after the test is housed in the division carrier SC; and, afterward, the division carrier SC is returned to the division carrier transfer equipment SCM2 via the in-process carriage means CI2 and CI1 and, further, is returned to the sorter S. In the sorter S, the wafers, the testing of which is finished in the division carrier SC, are extracted and are housed in the lot carrier LC again. The division carrier SC made vacant is returned to the division carrier transfer equipment SCM2 and is returned to the in-process carriage means CI2 by the division carrier transfer equipment SCM2. The lot carrier LC housing plural wafers 2, the wafer testing of which is finished, is carried into the lot carrier stocker LCS2 and, afterward, proceeds to the succeeding process. The method of collecting wafers 2, the testing of which is finished, in the lot carrier LC again is described above, however, the invention is not limited to this, and divided wafers can be housed in another carrier as they are and may also proceed to the succeeding process.

In the succeeding process, after the back of the wafer 2 is polished, the wafer 2 is divided into chips 2C using a dicing saw. Chips 2C that have been judged acceptable in the wafer test are extracted, and, after the external terminal 3 of the chip 2C and lead wire are connected, the chip is packaged. For a method of packaging, the chip may be packaged using a sealing resin or it may also be packaged using a ceramic.

Second Embodiment

In a second embodiment, a case in which the technical idea of the invention is applied to a preceding process will be described with reference to FIG. 13.

Figure 13:
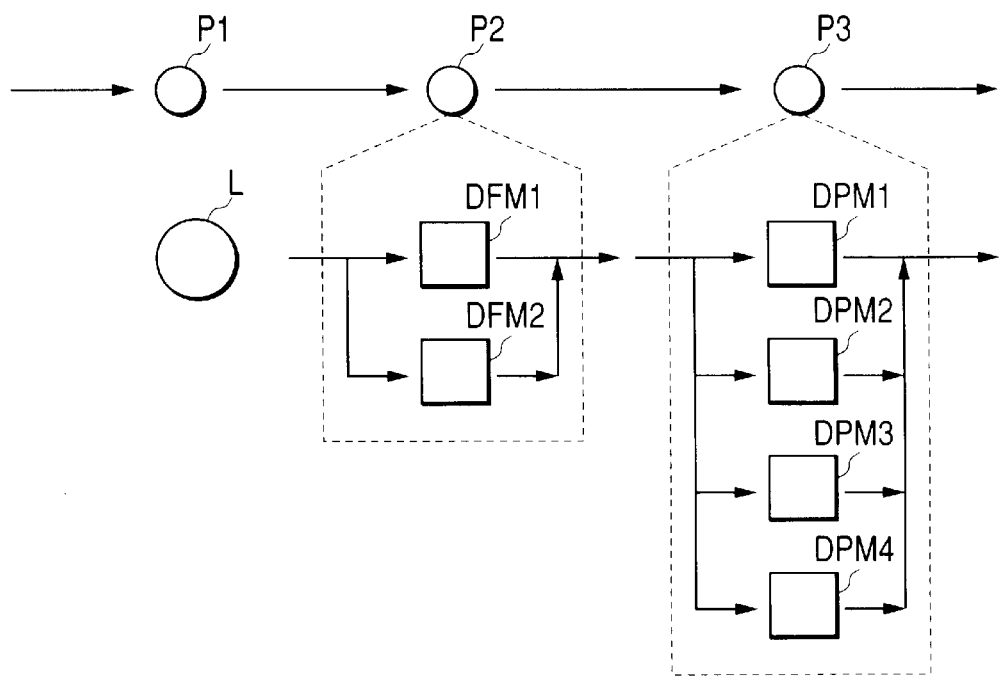
FIG. 13 is a diagram showing a manufacturing process (a preceding process) according to another embodiment of the invention in the fabrication of a semiconductor integrated circuit device.

A cleaning process P1, a diffusing process P2 and a film formation process P3 are sequentially shown from the left side of FIG. 13. As cleaning can be executed in a relatively short time and can also be executed in a batch, the technical idea of the invention is not applied to the cleaning process. A case in which the technical idea of the invention is applied to the diffusing process P2 and the film formation process P3 will be described below. In the diffusing process P2, for example, two diffusing processors (impurities doping processors) DFM1 and DFM2 are provided. In the film formation process P3, for example, four film formation processors DPM1 to DPM4 are provided. For the film formation processors DPM1 to DPM4, for example, low-voltage chemical vapor deposition (CVD) equipment that can form a film on two wafers in one film formation processing is used. In place of the diffusing processor, ion implantation equipment also can be used.

The method of dividing a lot L in the diffusing process P2 and the film formation process P3 is the same as the method described with reference to the first embodiment. For example, in the film formation process P3, prior to processing, plural wafers 2 included in the lot L are divided according to a situation of a group of the film formation processors DPM1 to DPM4. For example, in case twelve wafers 2 are housed in the lot L, the lot is divided into four groups, each of which includes three wafers. Next, each divided group (for example, in four division carriers SC housing three wafers 2) is allocated to a respective one of the film formation processors DPM1 to DPM4. In each of the film formation processor DPM1 to DPM4, two wafers 2 are extracted at a time from the division carrier SC and film formation processing is applied to them. Afterward, wafers 2, the processing of which is finished, are returned to a vacant lot carrier LC and the lot carrier LC is carried to the following manufacturing process. A FOUP is also used for the lot carrier. It is desirable that a FOUP is used for the division carrier SC used in the in-process carriage because the division carrier is used in the preceding process and high cleanliness (for example, approximately a class 1) is required.

According to such a second embodiment, as in the first embodiment, since the processing time can be reduced in the preceding process of a semiconductor integrated circuit device and the velocity of a flow can be unified in the whole preceding process of the semiconductor integrated circuit device, the QTAT of the semiconductor integrated circuit device can be realized.

Figure 14:
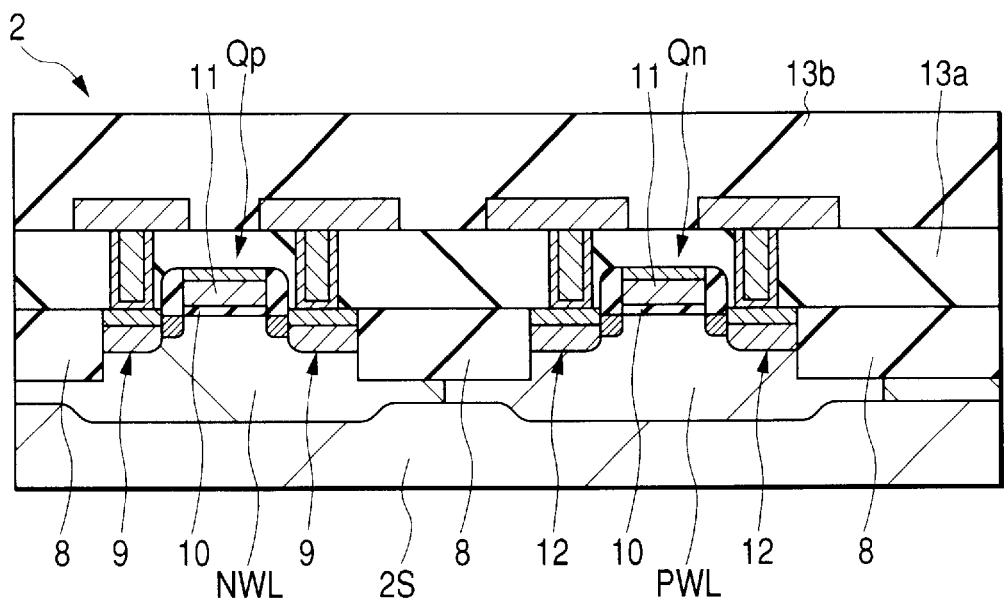
FIG. 14 is a sectional view showing the main part of a wafer in the manufacturing process according to another embodiment of the invention in the fabrication of a semiconductor integrated circuit device.

FIG. 14 shows an example of the cross-section of the main part of a wafer 2 after the film formation process P3. A substrate 2S in a process for the wafer 2 is made of monocrystalline silicon, for example, and an N-type well NWL and a P-type well PWL are formed on the main surface (the device formation surface). A channel-type isolating part 8 is formed on the main surface of the substrate 2S. The channel-type isolating part 8 is formed by burying a silicon oxide film in a groove formed in the substrate 2S.

In an active region surrounded by the channel-type isolating part 8, a pMISQp is formed in the N-type well NWL and a nMISQn is formed in the P-type well PWL. A pMISQp is provided with semiconductor regions 9, 9 for a source and a drain, a gate insulating film 10 and a gate electrode 11. In the semiconductor region 9, for example, boron is doped. A nMISQn is provided with semiconductor regions 12, 12 for a source and a drain, a gate insulating film 10 and a gate electrode 11. In the semiconductor region 12, for example, phosphorus or arsenic is doped. The gate insulating film 10 is made of a silicon oxide film, for example. The gate electrode 11 is acquired by forming a silicide layer, such as cobalt silicide, on a low-resistance polysilicon film, for example. Layer insulation films 13a and 13b made of a silicon oxide film, for example, are deposited on the main surface of such a substrate 2S in order from the downside. The N-type well NWL, the P-type well PWL and the semiconductor regions 9 and 12 are formed by the diffusing processors DFM1 and DFM2. The layer insulation films 13a and 13b are formed by the film formation processors DPM1 to DPM4.

Third Embodiment

In a third embodiment, a transformed example of a rule of the division of a lot will be described with reference to FIG. 15.

Figure 15:
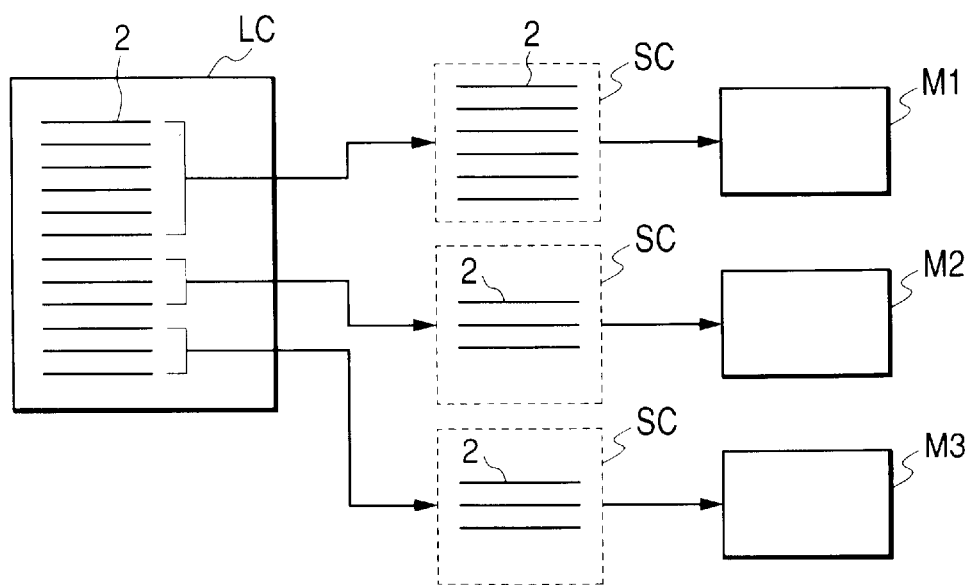
FIG. 15 is a diagram illustrating a rule of the division of a lot in the manufacturing process according to another embodiment of the invention in the fabrication of a semiconductor integrated circuit device.

FIG. 15 shows a case in which twelve wafers 2, for example, are housed in one lot carrier LC. Out of these wafers, six wafers 2 from the top are a group based upon the same condition (or the same product) of JA, the next three wafers 2 are a group based upon another same condition (or the same product) of JB and the next three wafers 2 are a group based upon a further same condition (or the same product) of JC.

That is, in a manufacturing process (particularly in a process for a prototype and a process for multi-item low volume production) of a semiconductor integrated circuit device, in the same manufacturing process, including a test process, conditions may be slightly different. In that case, in one lot carrier LC, wafers 2 different in condition may be housed in a mixed state. The above-mentioned condition refers to a condition related to a process, such as a condition for doping impurities, and the thickness of a film and a test condition, such as a resistance value, a capacitance value and a clock rate of an input signal. In a process of multi-item low volume production, since the required volume is low, though production ranges over multiple items, wafers 2 for products of multiple items may be housed in a mixed state in one lot carrier LC.

In such a case, when a lot is divided, plural wafers 2 in the lot are divided for every same condition or every same product. In this case, six wafers 2, three wafers 2 and three wafers 2 are respectively allocated to manufacturing devices M1 to M3. As a result, each of the manufacturing devices M1, M2, M3 can be specialized in such a way that the manufacturing device M1 is dedicated to a condition or a product of JA, the manufacturing device M2 is dedicated to a condition or a product of JB, and the manufacturing device M3 is dedicated to a condition or a product of JC. Hereby, as conditions are not required to be switched in the manufacturing devices M1, M2 and M3, the processing time, including the test time in the manufacturing process including a test process, can be reduced.

Fourth Embodiment

In a fourth embodiment, a further transformed example of a rule of the division of a lot will be described with reference to FIG. 16.

Figure 16:
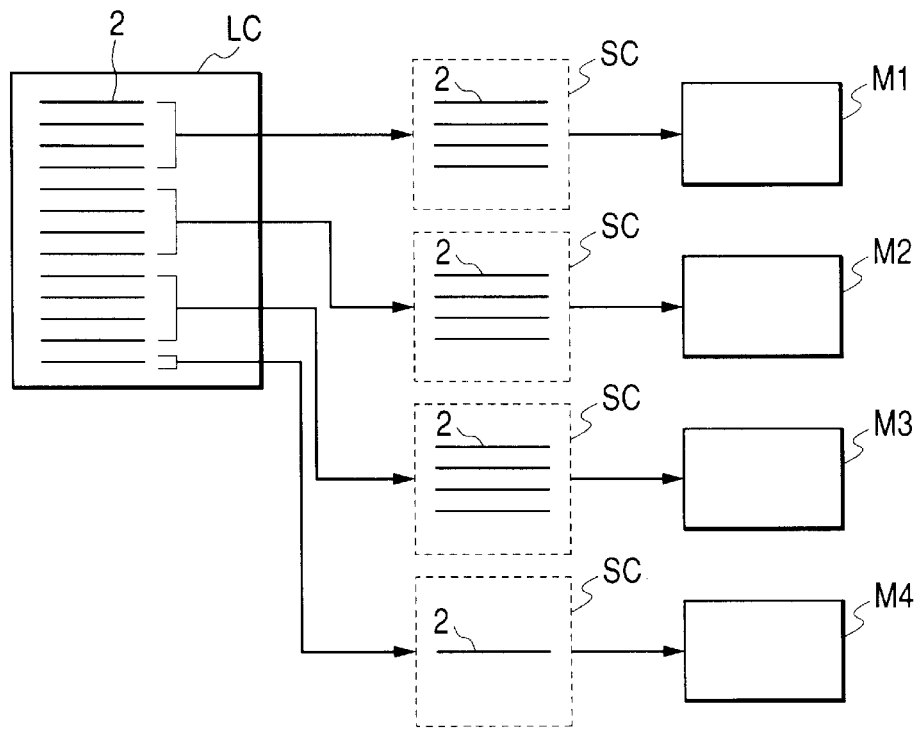
FIG. 16 is a diagram illustrating a rule of the division of a lot in a manufacturing process according to a further embodiment of the invention in the fabrication of a semiconductor integrated circuit device.

FIG. 16 shows a case in which thirteen wafers 2 are housed in one lot carrier LC. Suppose that out of these wafers, the lowest wafer 2 is required to be processed immediately.

In such a case, when a lot is divided, the wafer 2, the immediate processing of which is demanded, is allocated to one manufacturing device M4, and the remaining twelve wafers 2 are divided into three groups for the manufacturing devices M1 to M3 so that wafers of equal number are allocated or a load is unified according to a situation of processing in the manufacturing devices M1 to M3 or conditions are equal as in the third embodiment. In this case, four, four, four and one wafers 2 are respectively allocated to the manufacturing devices M1 to M4.

As a result, since the manufacturing device M4 can be dedicated to a wafer 2 for which immediate processing is required, the processing of the wafer 2 can be finished immediately. That is, correspondence to a demand for immediate processing is enabled. For an applied example, in case interruption occurs, the corresponding wafer is allocated to one manufacturing device and the residual wafers also can be divided according to various rules. Hereby, flexible correspondence to interruption is also enabled in a manufacturing process of a semiconductor integrated circuit device.

Fifth Embodiment

In a fifth embodiment, a transformed example of the configuration of the manufacturing devices will be described.

In the first to fourth embodiments, a case in which the manufacturing device has one processor is described. However, the concept of a manufacturing device in this embodiment is not limited to this, and the manufacturing device may consist of a group of the same manufacturing devices.

Figure 17:
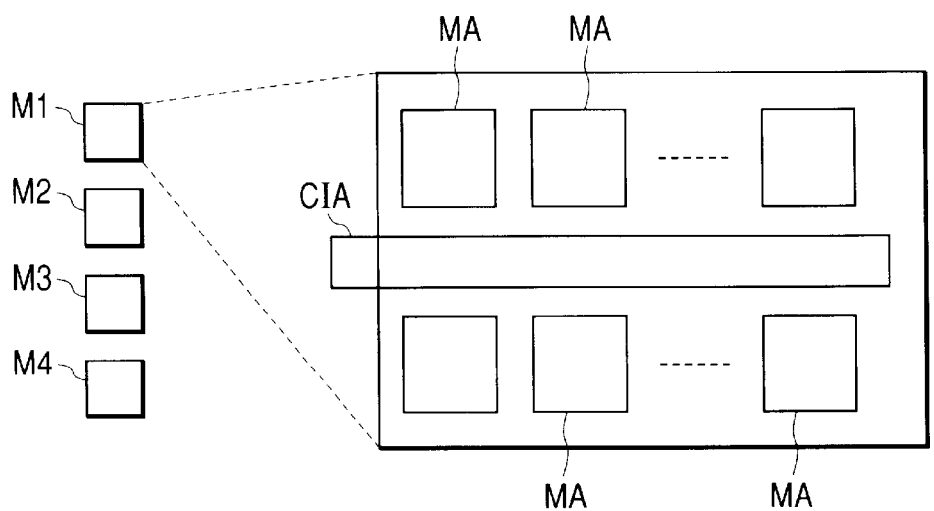
FIG. 17 is a diagram showing a transformed example of a manufacturing device in a manufacturing process according to the other embodiment of the invention in the fabrication of a semiconductor integrated circuit device.

FIG. 17 shows an example. In FIG. 17, each of the manufacturing devices M1 to M4 is provided with carriage means CIA and a group of plural manufacturing devices MA for the same processing arranged on both sides of the carriage means. In this case, plural wafers acquired by dividing a lot are further allocated and carried to each of the plural manufacturing devices MA and can be processed in parallel. Suppose that, in a case where one lot carrier includes twelve wafers, three wafers are respectively allocated to the manufacturing devices M1 to M4. In each of the manufacturing devices M1 to M4, the three wafers are allocated to three manufacturing devices MA and can be processed in parallel. Hereby, the processing time in the manufacturing devices M1 to M4 can be further reduced.

The invention made by the present inventors has been described above based upon various embodiments, however, the invention is not limited to these embodiments, and it need scarcely be said that in a range that does not deviate from the object, the invention can be variously changed.

For example, the technical idea of the invention also may be applied to a test of each chip on a wafer after a so-called wafer process package (WPP) process in which a packaging process is collectively applied to plural chips formed on a wafer after a preceding process in a state of a wafer.

In the second embodiment, a case in which the technical idea of the invention is applied to a diffusing process and a film formation process has been described, however, the invention is not limited to this, but can be applied to various cases. For example, it can also be applied to an exposure process. Since an exposure device corresponding to a wafer having a large diameter is very high-priced, it is essential to enhance the rate of operation and throughput.

The invention made by the present inventors has been applied to the fabrication of a semiconductor integrated circuit device, which is an object of the application of the invention, however, the invention is not limited to this and also can be applied to a method of fabrication of a liquid crystal substrate and a method of fabrication of a micromachine.

Of the various aspects of the invention disclosed in this application, a brief description of the effect achieved by the invention is as follows.

That is, since the time waiting for processing of wafers in a control unit in each manufacturing process can be reduced by providing a process for dividing and allocating plural wafers in the control unit to plural one sheet processors connected via a carriage route and processing them in the plural one sheet processors in parallel and manufacturing time per process can be reduced, the overall manufacturing time of the semiconductor integrated circuit device can be reduced.

What is claimed is:

1. A fabrication method of a semiconductor integrated circuit device, comprising the steps of:
   (a) carrying a plurality of wafers housed in a first carriage container to a sorter from a preceding manufacturing process;
   (b) dividing the wafers in the first carriage container into a plurality of second carriage containers in the sorter, at least one of the second carriage containers housing a plurality of wafers;
   (c) carrying respectively the divided wafers in the second carriage containers to a plurality of single wafer processing apparatuses performing identical processes to the wafers; and
   (d) taking out the wafers from the second carriage containers, and respectively housing them into the plurality of single wafer processing apparatuses to perform the identical processes to the wafers in parallel.

2. A fabrication method of a semiconductor integrated circuit device according to claim 1, wherein in the step (b), the wafers in the sorter are divided so that the number of the divided wafers is substantially uniform to the respective single wafer processing apparatuses.

3. A fabrication method of a semiconductor integrated circuit device according to claim 1, wherein in the step (b), the wafers in the sorter are divided according to an operational situation or a situation of work in the single wafer processing apparatuses.

4. A fabrication method of a semiconductor integrated circuit device according to claim 1, wherein in the step (b), the plural wafers in the sorter are divided so that a load in the single wafer processing apparatuses is substantially uniform.

5. A fabrication method of a semiconductor integrated circuit device according to claim 1, wherein in the step (b), the plural wafers in the sorter are divided so that the divided wafers in the same second carriage containers are processed on substantially the same condition.

6. A fabrication method of a semiconductor integrated circuit device according to claim 1, wherein a wafer required to be immediately processed out of the wafers in the sorter is housed in one of the second carriage containers, and residual plural wafers except the wafer required to be immediately processed are housed in other ones of the second carriage containers.

7. A fabrication method of a semiconductor integrated circuit device according to claim 1, wherein the outside dimension of the second carriage container is smaller than the outside dimension of the first carriage container.

8. A fabrication method of a semiconductor integrated circuit device according to claim 1, wherein the single wafer processing apparatuses are inspection equipment for checking the electric characteristics of plural chips on the wafers.

9. A fabrication method of a semiconductor integrated circuit device according to claim 1, wherein the single wafer processing apparatuses are impurities doping apparatuses or film formation apparatuses.

10. A fabrication method of a semiconductor integrated circuit device according to claim 1, wherein the second carriage container is carried to the single wafer processing apparatuses via a first continuous carriage apparatus and a second linear carriage apparatus which is connected to the first carriage apparatus.

11. A fabrication method of a semiconductor integrated circuit device according to claim 10, wherein each height of the first carriage apparatus and the second carriage apparatus is substantially the same.

12. A fabrication method of a semiconductor integrated circuit device, comprising the steps of:
   (a) carrying a plurality of wafers to a sorter from a preceding manufacturing process in a state that they are housed in a first carriage container;
   (b) dividing the wafers in the first carriage container into a plurality of second carriage containers in the sorter, at least one of the second carriage containers housing a plurality of wafers;
   (c) carrying respectively the divided wafers in the second carriage containers to a plurality of single wafer processing apparatuses performing identical processes to the wafers;
   (d) taking out the wafers housed in each of the second carriage containers and introducing them into corresponding one of the single wafer processing apparatuses; and
   (e) processing the wafers in the single wafer processing apparatuses in parallel.

13. A fabrication method of a semiconductor integrated circuit device according to claim 12, wherein in the step (b), the wafers in the sorter are divided so that the number of the divided wafers is uniform to the respective single wafer processing apparatuses.

14. A fabrication method of a semiconductor integrated circuit device according to claim 12, wherein in the step (b), the wafers in the sorter are divided according to an operation situation or a situation of work in the single wafer processing apparatuses.

15. A fabrication method of a semiconductor integrated circuit device according to claim 12, wherein in the step (b), the wafers in the sorter are divided so that a load in the single wafer processing apparatus is substantially uniform.

16. A fabrication method of a semiconductor integrated circuit device according to claim 12, wherein in the step (b), the wafers in the sorter are divided so that the divided wafers in the same second carriage containers are processed on the same condition.

17. A fabrication method of a semiconductor integrated circuit device according to claim 12, wherein a wafer required to be immediately processed out of the wafers in the sorter is housed in one of the second carriage containers, and residual plural wafers except the wafer required to be immediately processed are housed in other ones of the second carriage containers.

18. A fabrication method of a semiconductor integrated circuit device according to claim 12, wherein the outside dimension of the second carriage container is smaller than the outside dimension of the first carriage container.

19. A fabrication method of a semiconductor integrated circuit device according to claim 12, wherein the single wafer processing apparatuses are inspection equipment for checking the electric characteristics of plural chips on the wafers.

20. A fabrication method of a semiconductor integrated circuit device according to claim 12, wherein the single wafer processing apparatuses are impurities doping apparatuses or film formation apparatuses.

21. A fabrication method of a semiconductor integrated circuit device according to claim 12, wherein the second carriage container is carried to the single wafer processing apparatuses via first continuous carriage apparatus and second linear carriage apparatus connected to the first carriage apparatus.

22. A fabrication method of a semiconductor integrated circuit device according to claim 21, wherein each height of the first carriage apparatus and the second carriage apparatus is substantially the same.

23. A fabrication method of a semiconductor integrated circuit device, comprising:
   (a) a first manufacturing process for manufacturing a semiconductor integrated circuit device;
   (b) a second manufacturing process for manufacturing the semiconductor integrated circuit device; and
   (c) an intermediate process between the first and second manufacturing processes for carrying a plurality of wafers in a state that they are housed in a first carriage container in a sorter
   (d) dividing the wafers in the first carriage container into a plurality of second carriage containers in the sorter, at least one of the second carriage containers housing a plurality of wafers;
   (e) carrying respectively the divided wafers in the second carriage containers to a plurality of single wafer processing apparatuses performing identical processes to the wafers; and
   (f) taking out the wafers housed in each of the second carriage containers and introducing them into corresponding one of the single wafer processing apparatuses in parallel.

24. A fabrication method of a semiconductor integrated circuit device according to claim 23, wherein in the division process, the wafers in the sorter are divided so that the number of the divided wafers is uniform to the respective single wafer processing apparatuses.

25. A fabrication method of a semiconductor integrated circuit device according to claim 23, wherein in the division process, the wafers in the sorter are divided according to an operational situation or a situation of work in the single wafer processing apparatuses.

26. A fabrication method of a semiconductor integrated circuit device according to claim 23, wherein in the division process, the wafers in the sorter are divided so that a load in the single wafer processing apparatuses is substantially uniform.

27. A fabrication method of a semiconductor integrated circuit device according to claim 23, wherein in the division process, the wafers in the sorter are divided so that the divided wafers in the same second carriage containers are processed on the same condition.

28. A fabrication method of a semiconductor integrated circuit device according to claim 23, wherein a wafer required to be immediately processed out of the wafers in the sorter is housed to one of the second carriage containers, and residual plural wafers except the wafer required to be immediately processed are housed in other ones of the second carriage containers.

29. A fabrication method of a semiconductor integrated circuit device according to claim 23, wherein the outside dimension of the second carriage container is smaller than the outside dimension of the first carriage container.

30. A fabrication method of a semiconductor integrated circuit device according to claim 23, wherein single wafer processing apparatuses in the first manufacturing process are an impurities doping apparatuses, and single wafer processing apparatuses in the second manufacturing process are film formation apparatuses.

31. A fabrication method of a semiconductor integrated circuit device according to claim 23, wherein the second carriage container is carried to the single wafer processing apparatuses via first continuous carriage apparatus and second linear carriage apparatus connected to the first carriage apparatus.

32. A fabrication method of a semiconductor integrated circuit device according to claim 31, wherein each height of the first carriage apparatus and the second carriage apparatus is substantially the same.

* * * * *